Patented Feb. 7, 1950

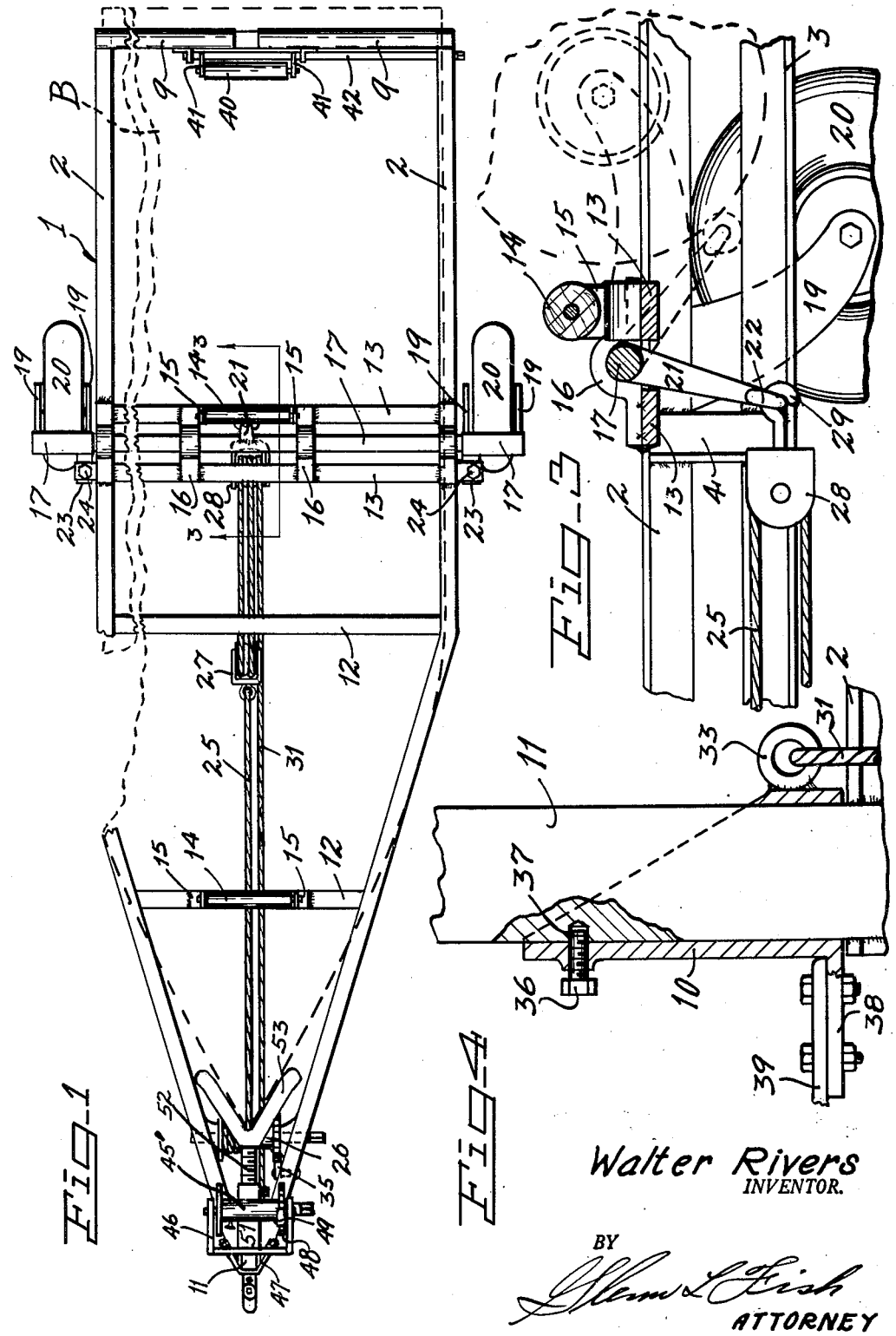

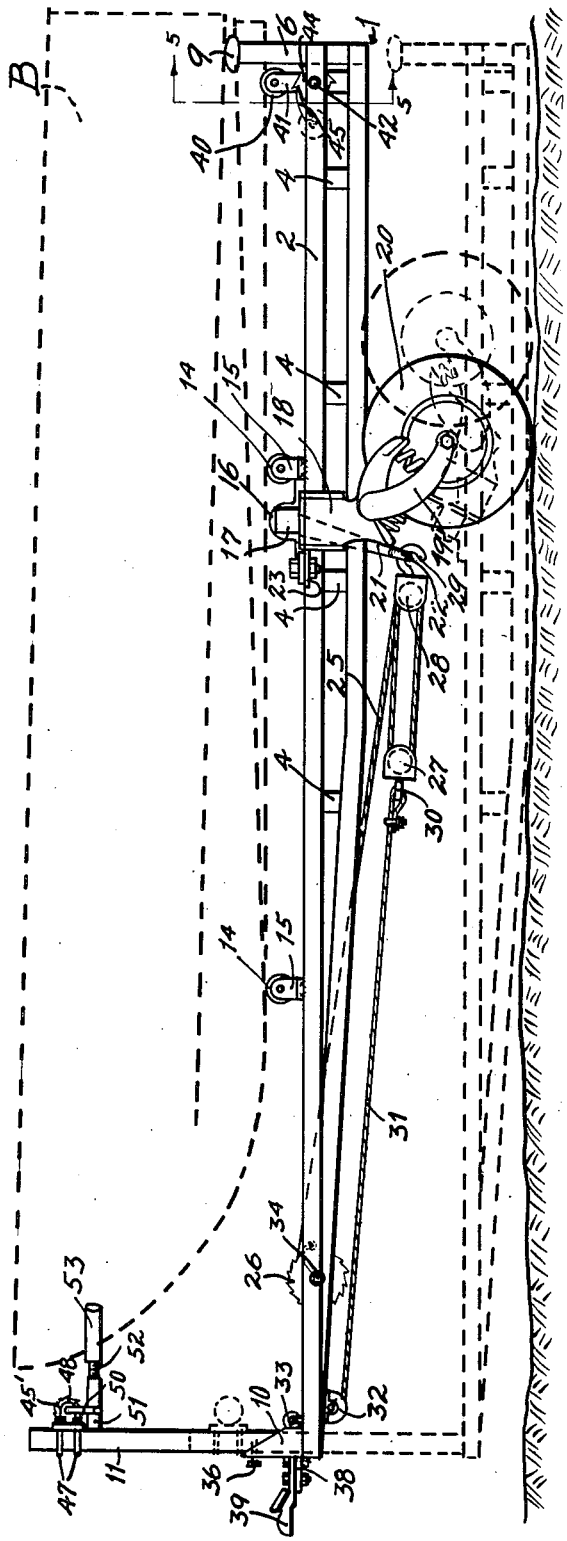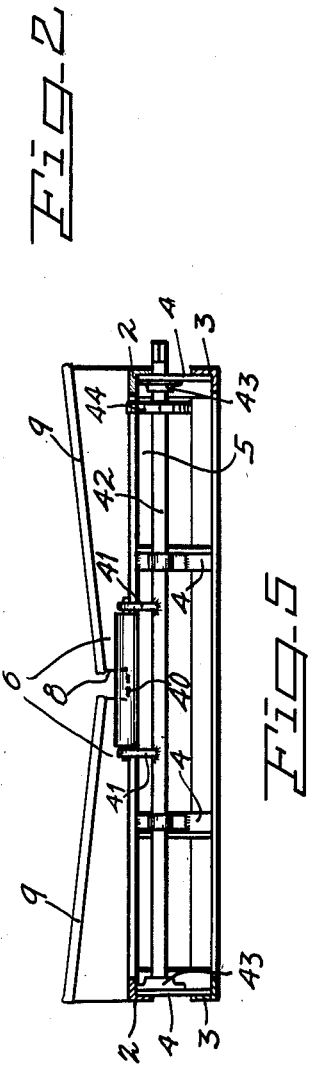

2,496,599

UNITED STATES PATENT OFFICE 2,496,599

BOAT TRAILER

Walter Rivers, Coeur d'Alene, Idaho

Application June 25, 1948, Serial No. 35,079

4 Claims. (Cl. 214—65)

This invention relates to a boat trailer and it is one object of the invention to provide a wheeled trailer or cradle of such construction that a row boat, or similar craft of such weight that it cannot be easily lifted upon the top of an automobile, may be readily transported from one place to another.

Another object of the invention is to provide a trailer of such formation that it may be slid longitudinally into water at a beach line and the boat moved into position over the trailer, the trailer being then raised from a sunken position in which it supports the boat and may be drawn out of the water and carry the boat with it.

Another object of the invention is to provide a trailer or cradle provided with supporting wheels carried by an axle which is mounted for turning or rocking movement and causes arms carrying the wheels to be swung downwardly to a position in which they rest upon the ground and support the trailer in its raised position for towing.

Another object of the invention is to provide a trailer having improved means for securing a boat in place thereon.

The invention is illustrated in the accompanying drawings wherein:

Fig. 1 is a top plan view of the improved trailer.

Fig. 2 is a side view of the trailer, the lowered position thereof being indicated by dotted lines.

Fig. 3 is a fragmentary sectional view upon an enlarged scale taken along the line 3—3 of Figure 1.

Fig. 4 is a fragmentary sectional view taken vertically through the front end of the trailer.

Fig. 5 is a transverse sectional view taken through the rear portion of the trailer along the line 5—5 of Figure 2.

This improved trailer constitutes a cradle by means of which a row boat, or other heavy boat, may be supported and towed back of an automobile or equivalent towing vehicle. The body or frame which is indicated in general by the numeral 1 is formed of channel metal bars and has side bars 2 braced against downward sag by bracing bars 3 which extend longitudinally of the side bars and are spaced downwardly therefrom by spacers 4. A rear cross bar 5 extends between rear ends of the bracing bars 4 and over this rear bar is a saddle or support 6 braced by spacers 4 and upon which rests the rear end of the boat B when the boat is at rest upon the trailer. The saddle 6 is gradually reduced in thickness from its end towards a point midway the width of the frame and at this midpoint there is formed a notch or recess 8. It will thus be seen that when a boat is resting upon the trailer the saddle will conform substantially to the transverse shape of the bottom of the boat and the rear end of the keel thereof will fit into the recess. Therefore the boat may not tilt transversely and topple off of the trailer. The upper edge face of the saddle is covered with padding 9 to protect the bottom of the boat. The forward portions of the side bars 2 converge forwardly and have their front ends secured to the lower end of a vertically extending sleeve 10 through which passes a post 11, and upon referring to Figure 2 it will be seen that forward portions of the bracing bars 3 slope upwardly and have their upper surfaces bevelled or disposed at such an incline that they may be secured in flat face to face contact with under faces of the side bars.

Cross bars 12 and 13 are mounted between the side bars 2 to brace the frame against transverse strains and over certain of these cross bars are rollers 14 mounted in bearing brackets 15. The rollers 14 are so spaced from each other that they will have good supporting engagement with the keel of the boat and allow the boat to be easily slid longitudinally onto or off of the trailer. The bearing brackets for the rear roller are mounted upon inner ones of brackets 16 which are carried by the cross bars 13 and rotatably support an axle 17 for rocking movement. Ends 17 of the axle project from opposite sides of the frame and carry mounting members 18 which include forks 19 between which ground engaging wheels 20 are rotatably mounted. An arm or lever 21 having an eye 22 at its lower end extends downwardly from the axle and when this lever is pulled forwardly the wheels will be disposed in contact with the ground but when pull upon the lever is released the mounting members may swing upwardly and support the wheels in the raised or inoperative position indicated by dotted lines in Figures 2 and 3. Ears 23 project forwardly from the mounting members and when bolts 24 are passed through ends of the forward cross bar 13 and through the ears and their nuts tightened the mounting members will be held in the lower position and the wheels maintained in operative engagement with the ground.

In order to swing the lever 21 forwardly and rotate the axle to cause the cradle to be moved upwardly to a raised position there has been provided a cable 25 which is wound upon a drum 26 rotatably mounted between forward end portions of the side bars 2. This cable is trained through pulley blocks 27 and 28 and secured at its outer end to the block 28 which carries a hook 29 for engagement with the eye 22 of the lever. The block 27 carries an eye 30 to which a cable 31 is secured, and upon referring to Figure 2 it will be seen that the cable 31 is trained about a pulley 32 and has its front end secured to an eye 33 extending rearwardly from the lower end of the sleeve 10. By applying a crank handle to the squared end of the shaft 34 of the drum 26 the drum may be turned and the cable 25 wound upon the drum and pull exerted upon the lever 21. One head of the drum is formed with ratchet teeth for engagement by a pawl or dog 35 to prevent unintentional rotation of the drum in an unwinding direction. A screw 36 threaded through the front wall of the sleeve near the upper end thereof and engaged in a selected socket 37 formed in the post holds the post in a vertically adjusted position. An arm 38 projects forwardly from the lower end of the sleeve and to this is secured a hitch 39 by means of which the trailer is connected with the towing vehicle.

While the boat is being moved into place upon the cradle or trailer its keel should be held out of the groove 8 and in order to do so there has been provided a roller 40 rotatably mounted between bearing brackets or arms 41 which project radially from a shaft 42. This shaft is rotatably mounted in bearings 43 and when a crank handle is applied to the squared end of this shaft to rotate the same the roller 40 may be swung upwardly to a raised position and hold the keel of the boat out of the recess 8. When the roller is in the lowered or inoperative position indicated by dotted lines in Figure 2 the keel may rest in the recess and prevent transverse movement of the rear end of the boat upon the trailer. Unintentional rotation of the shaft 42 in a direction allowing downward movement of the roller 40 is prevented by providing the shaft with a ratchet wheel 44 disposed in position for engagement by a pawl 45. Forward movement of the boat onto the trailer is effected by means of a rope or cable which is wound upon a winch or drum 45' rotatably mounted in a bearing bracket 46 secured near the upper end of the post by fasteners 47 of the U-bolt type. The drum is provided at one end with teeth to form a ratchet wheel 48 engaged by a pawl or dog 49 and the shaft of the drum has one end squared to receive a crank handle 50 which is preferably the same crank handle used for turning the drum 26 and the rocker shaft 42. Below the drum 45' is an internally threaded tube 51 which projects rearwardly and is open at its rear end to receive the threaded shank 52 of a V-shaped stop 53. The stop 53 is of sufficient size to straddle the bow of the boat and as its shank is screwed into the tube 51 it may be adjusted longitudinally of the trailer and thus disposed in proper position for engagement with the boat and prevent the bow of the boat from moving transversely of the trailer.

In order to remove a boat from a lake, river, or other body of water, the trailer is backed into the water and the boat moved forwardly until its bow moves across the rear end of the trailer which will be resting upon the ground with its wheels in the raised position. The rope wound upon the drum 45 is attached to the boat at the bow thereof and the drum turned to wind the rope thereon and since the bottom of the boat and its keel will rest upon the rollers 14 and 40 the boat may be easily shifted forwardly. When the boat is in place over the trailer or cradle with its bow engaged in the stop 53 the shaft 42 is turned to lower the roller 40 and the keel will rest in the recess 8 as the bottom of the boat moves into engagement with the padded support or bolster 6. After the boat is at rest upon the trailer the drum 26 is turned to wind the cable 25 thereon and as this cable is tightened it exerts pull upon the lever 21 and swings the lever rearwardly to rotate the axle swinging the mountings 29 downwardly until the wheels 20 rest upon the ground and support the cradle in a raised position. Simultaneously the cable 31 passing under pulley 32 pulls on eye 33 and raises post 11 in sleeve 10, the bolts 24 and 36 being then applied to secure the mountings in the raised position. The cradle will thus be supported by its wheels and the trailer hitch 39 and when it is connected with a towing vehicle by its hitch 39 the trailer may be towed to a place of storage or to another place where it is to be launched for use. Launching is effected by merely reversing the steps taken to load the boat upon the trailer.

Having thus described the invention, what is claimed is:

1. A trailer for loading and transporting a boat back of a towing vehicle comprising a frame having a saddle extending across its rear end for receiving the rear portion of a boat, rollers extending transversely of the frame and spaced from each other longitudinally thereof, the rear one of said rollers being shiftable vertically into and out of a raised position for preventing contact of the boat with the saddle as the boat is moved forwardly into position over the trailer, bracing means for engaging the bow of the boat and preventing movement thereof transversely of the trailer, wheels mounted for movement into and out of position for supporting the frame in a raised position out of contact with the ground, and means for connecting the front end of the trailer with a towing vehicle.

2. A trailer for transporting a boat back of a towing vehicle comprising a frame having means for supporting a boat thereon, an axle extending transversely across said frame and rotatably mounted for rocking movement, mounting members extending from said axle and carrying ground-engaging wheels, a lever extending from said axle radially thereof, a drum rotatably mounted in said frame, a block and tackle having front and rear pulley blocks and a cable trained about the pulleys and wound upon said drum, the rear block being connected with said lever and the front block being connected with said lever and the front block being connected with the frame, the rear block being shifted forwardly by rotation of the drum to tighten the cable and exerting pull upon the lever to rotate the axle and swing the mounting members downwardly to dispose the wheels in engagement with the ground and support the frame in a raised position, and means for connecting the front end of the trailer with a towing vehicle.

3. A trailer for loading and transporting a boat back of a towing vehicle comprising a frame having means for supporting a boat thereon, an axle rotatably mounted transversely of the frame, members extending radially from the axle and carrying ground-engaging wheels, a lever extending downwardly from said axle, a drum in the forward portion of said frame, a block and tackle including front and rear pulley blocks and a cable trained about the pulleys and wound upon said drum, a second drum carried by said frame, a cable wound upon the second drum and extending rearwardly therefrom with its rear end secured to the front block, a hook carried by the rear block and connected with the lower end of said lever, the cable of the block and tackle when wound upon the drum shifting the rear block forwardly and exerting pull upon the lever to turn the axle and swing the mounting members downwardly to dispose the wheels in engagement with the ground and support the frame in a raised position, and means for connecting the front end of the frame with a towing vehicle.

4. A trailer for loading and transporting a boat back of a towing vehicle comprising a frame having rollers spaced from each other longitudinally thereof and a saddle at its rear end for engagement with the bottom of a boat, wheels mounted for movement from a raised and inoperative position to a lowered position for engaging the ground and supporting the frame in a raised position, a sleeve mounted vertically at the front end of said frame, a post passing vertically through said sleeve and projecting upwardly therefrom, a member carried by said sleeve for releasably securing the post in a vertically adjusted position, an internally threaded tube projecting rearwardly from the upper portion of said post, and a member having a threaded shank screwed into said tube and arms extending rearwardly from the shank for engaging opposite sides of the bow of a boat and preventing transverse movement thereof upon the frame.

WALTER RIVERS.

REFERENCES CITED

The following references are of record in the file of this patent:

UNITED STATES PATENTS

| Number | Name | Date |
| --- | --- | --- |
| 719,059 | Tabor | Jan. 27, 1903 |
| 2,294,110 | Donaldson | Aug. 25, 1942 |
| 2,361,951 | Livermon | Nov. 7, 1944 |
| 2,410,570 | Davis | Nov. 5, 1946 |
| 2,415,771 | Agtmael | Feb. 11, 1947 |
| 2,442,248 | Sampsell | May 25, 1948 |

FOREIGN PATENTS

| Number | Country | Date |
| --- | --- | --- |
| 496,549 | Great Britain | Nov. 28, 1938 |